United States Patent [19]

Hasz

[11] Patent Number: 4,800,790
[45] Date of Patent: Jan. 31, 1989

[54] MODAL COUPLING TAILSTOCK

[75] Inventor: John R. Hasz, Fayetteville, Ohio

[73] Assignee: Cincinnati Milacron Inc., Cincinnati, Ohio

[21] Appl. No.: 930,614

[22] Filed: Nov. 14, 1986

[51] Int. Cl.[4] ............................................. B23B 23/00
[52] U.S. Cl. ......................................... 82/31; 82/2 R
[58] Field of Search .................. 82/2 R, 31, 32, 33 R; 409/242

[56] References Cited

U.S. PATENT DOCUMENTS

| 1,490,405 | 4/1924 | Stanton | 82/31 |
| 1,549,278 | 8/1925 | Sondstrand | 82/2 R |
| 3,186,267 | 6/1965 | Pabst et al. | 82/2 R |
| 3,534,643 | 10/1970 | Markgrat | 82/32 |

FOREIGN PATENT DOCUMENTS 535962  4/1941  United Kingdom ..................... 82/31

Primary Examiner—Frederick R. Schmidt
Assistant Examiner—Robert Showalter
Attorney, Agent, or Firm—Thomas M. Farrell

[57] ABSTRACT

A tailstock for a turning machine has a housing portion adapted to be moved and clamped on the machine base, and the housing portion supports a beam portion which extends outwardly from the housing portion. The beam portion is nonsymmetrical, and of generally rectangular cross-section wherein its neutral axis is coincident with the center axis. Thus, the nonsymmetry of the center support has principle modes of compliance which are dissimilar and these modes, when added to the compliance of a cylindrical workpiece, tend to increase the dynamic stability of the tailstock end of the workpiece.

4 Claims, 5 Drawing Sheets

MODAL COUPLING TAILSTOCK

BACKGROUND OF THE INVENTION

The invention relates generally to machines for supporting shaft-like workpieces, and the invention relates specifically to tailstocks on turning machines for machining shaft-like parts of rotation.

Research into the dynamics of machine tool structures, particularly that shown in treatise Machine Tool Structures, Vol. 1 by Koenigsberger and Tlusty, Pergamon Press, Copyright 1970, contains a compilation of analysis work of a variety of reseachers. Tlusty has shown that for a variety of horizontal bed, manual lathes, that the weakest portion of the machining area lies along a shaft held between a headstock and tailstock at the tailstock center. This portion may be further weakened when a live center is preferred over a dead center.

Additionally, Tlusty has shown that operations such as grooving are more difficult to perform at the tailstock end of a workpiece on a lathe. Tlusty's work shows that of all the lathes investigated, two significant modes of vibration or instability are connected with the workpiece axis. The one with the lower frequency is almost horizontal with a slight inclination, while that with the higher frequency is almost vertical with a slight inclination, i.e. approximately 90° with respect to the first one.

Applicant has determined that, for example, on a horizontal bed machine, the turning process generates normal and tangential cutting forces on the workpiece, i.e. horizontal and vertical forces, (the resultant cutting force lying between the two). It has also been observed that most center support structures on tailstocks embody at least a snout for supporting a center quill and the snout is generally symmetrical (usually cylindrical) about the workpiece axis. Even on machines where a square snout is employed, the horizontal and vertical dimensions are identical. Therefore, these machines tend to have identical compliance of the snout/quill/center system in the vertical and horizontal directions. Applicant has determined that a far superior dynamic stability can be achieved by the inventive design, which provides for nonsymmetry between the tangential and normal cutting directions at the tool point. Specifically, applicant has determined that a massive, solid quasi-rectangular cross-section is most desirable for increasing machine stability at the tailstock end of the workpiece.

Workpiece size plays a great part in the overall dynamics of the turning machine stability, and applicant has considered that specific quill support cross-sections may be configured and sized for a given workpiece to be supported, but in commercial application, a machine must be capable of handling a variety of workpieces. Therefore, the range of workpieces to be handled has necessitated applicant's optimization of a tailstock support system, wherein the modes of compliance of the tailstock are coupled with the compliance of the workpiece to provide an outstanding support system.

Additionally, applicants have configured the tailstock support system so that the machine may be configured as a two-axis lathe, i.e. where a tool slide system moves a tool axially and radially with respect to a workpiece. Optionally, the machine may be configured as a four-axis machine, where a substantially identical slide system is used on the opposite side of the workpiece so that simultaneous machining operations may occur.

It is a therfore an object of the present invention to provide a tailstock support system having improved dynamic stability characteristics.

Another object of the present invention is to provide a tailstock support system wherein the tailstock center is suported in a noncylindrical beam section.

SUMMARY OF THE INVENTION

The invention is shown embodied in a turning machine having a headstock and tailstock for supporting a shaft-like workpiece, the tailstock including a center means for engaging the workpiece on a central axis, wherein the tailstock embodies improved apparatus comprising: a beam portion extending from the tailstock main housing portion, the beam portion having a neutral axis collinear with the tailstock central axis, and the beam cross-section is noncircular and has a minor axis normal to the neutral axis and generally oriented in line with the radial feed vector of a tool approaching the workpiece. The beam cross-section also has a major axis extending normal to both the neutral axis and the minor axis. In the preferred embodiment, the configuration of the beam portion extending from the tailstock is quasi-rectangular, i.e. the cross-section being of substantially-greater dimension along the major axis in respect to the dimension along the minor axis.

DESCRIPTION OF THE PREFERRED EMBODIMENT

Figure 1:
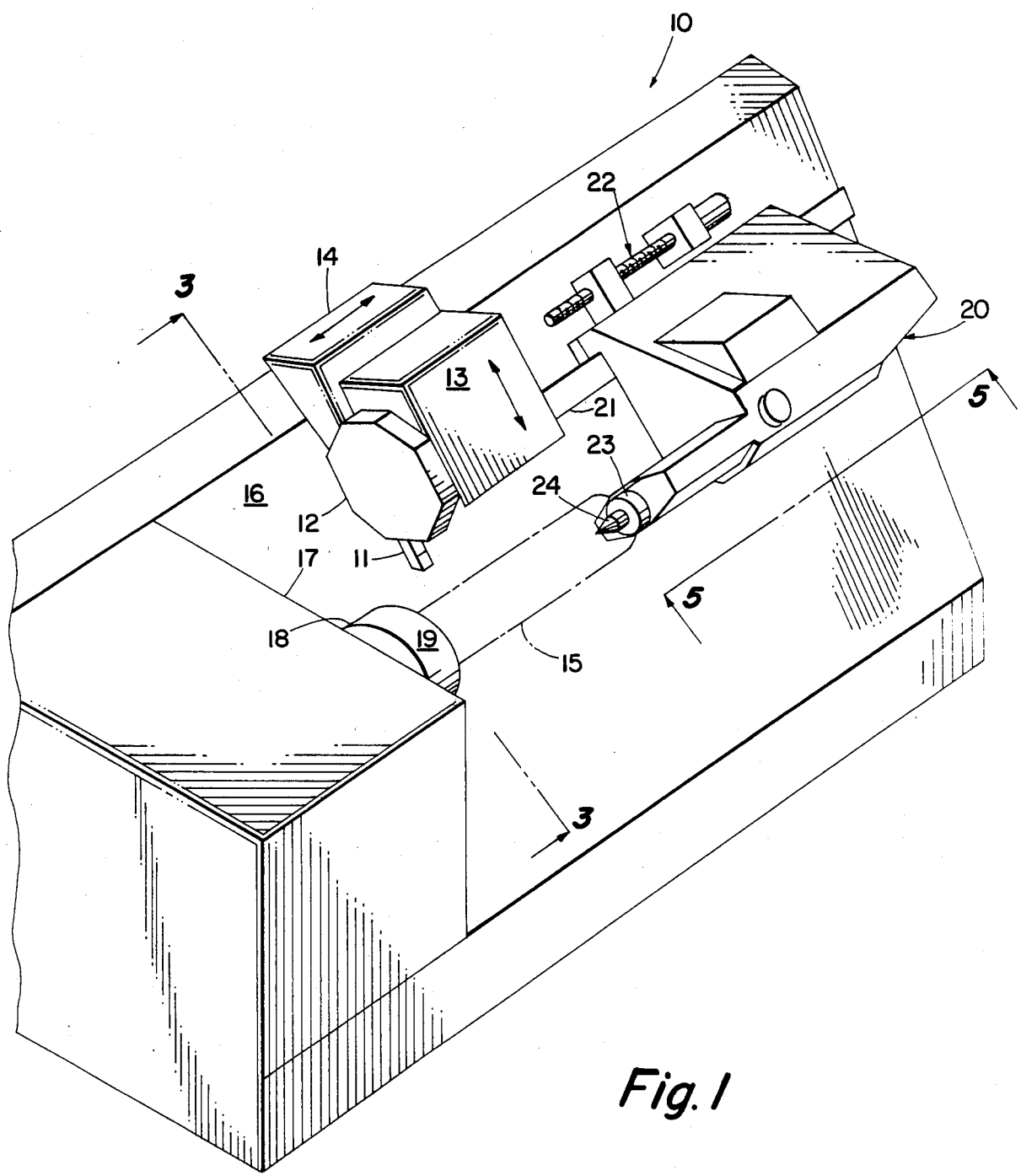
FIG. 1 is a perspective view of two-axis turning machine for turning shaft-like workpieces.

FIG. 1 of the drawings depicts a two-axis slant bed turning machine 10. A representative turning tool 11 is depicted in a tool turret 12, which is indexable and capable of supporting multiple tools 11 for a variety of operations. The tool turret 12 is carried on a cross-slide 13 and saddle 14 and is capable of movements in radial and axial directions, respectively, with respect to a workpiece 15. The machine 10 has a slanted bed, or base 16 and headstock 17, and the headstock 17 carries a rotatable spindle 18 and workholding chuck 19. A shaft-like workpiece 15 is shown extending between the chuck 19 and a tailstock 20. The tailstock 20 is movable on a way system 21 mounted to the base 16 under the impetus of a tailstock positioning unit 22, which does not form part of the present invention. The tailstock 20 comprises, in part, a quill 23 which is movable in axial directions to clamp and unclamp the workpiece 15 between the tailstock 20 and headstock 17. The quill 23 carries a center 24 configured to fit the workpiece 15 in manner well-known in the art. Once positioned with respect to the workpiece 15, the tailstock 20 is clamped on the machine base 16 by way clamps (not shown).

Figure 2:
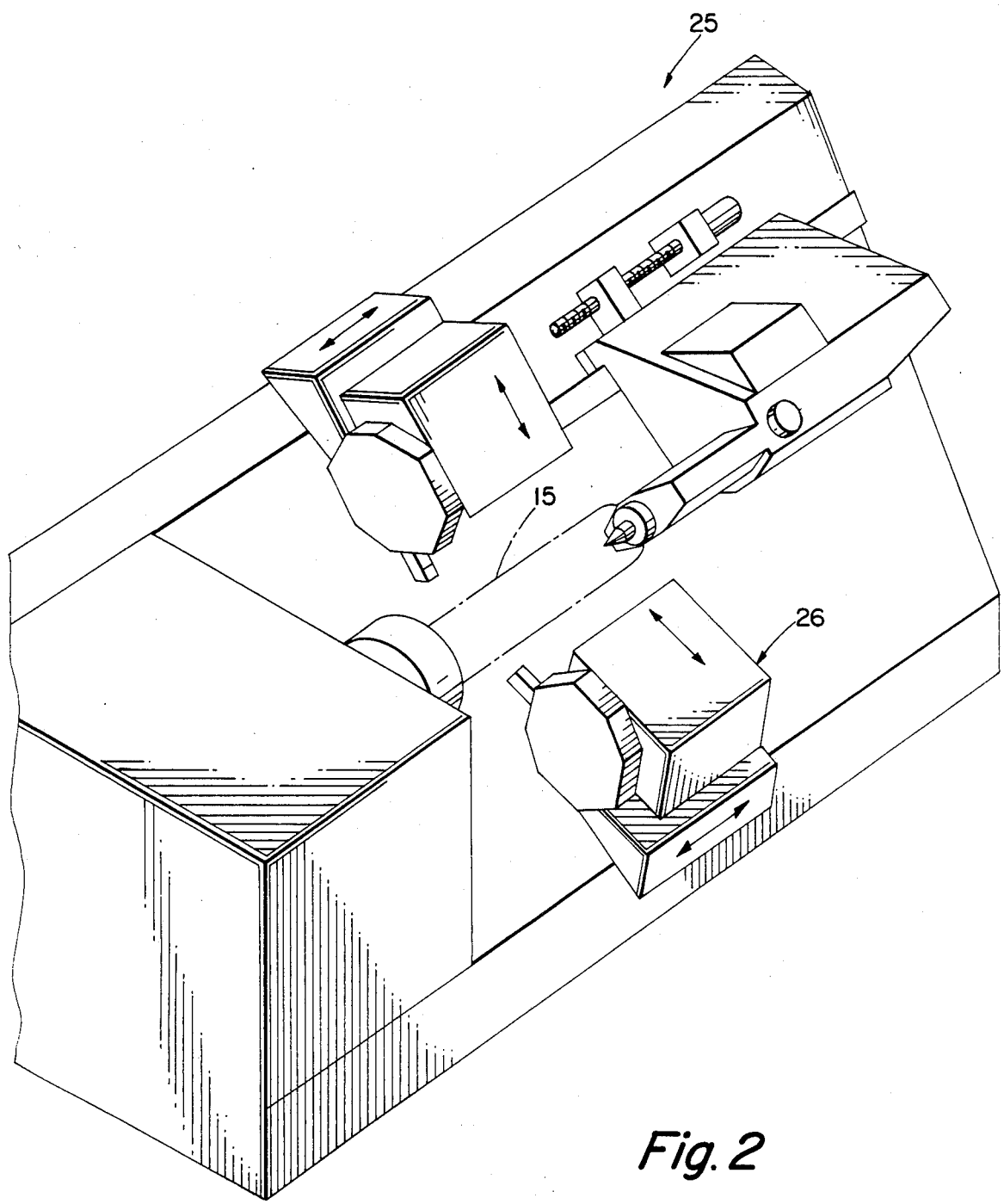
FIG. 2 is a perspective view of a four-axis turning machine for turning shaft-like workpieces.

FIG. 2 illustrates a four-axis turning machine 25 where a second tool turret and slide assembly 26 is positioned on the opposite side of the workpiece 15 for simultaneous turning operations.

Figure 3:
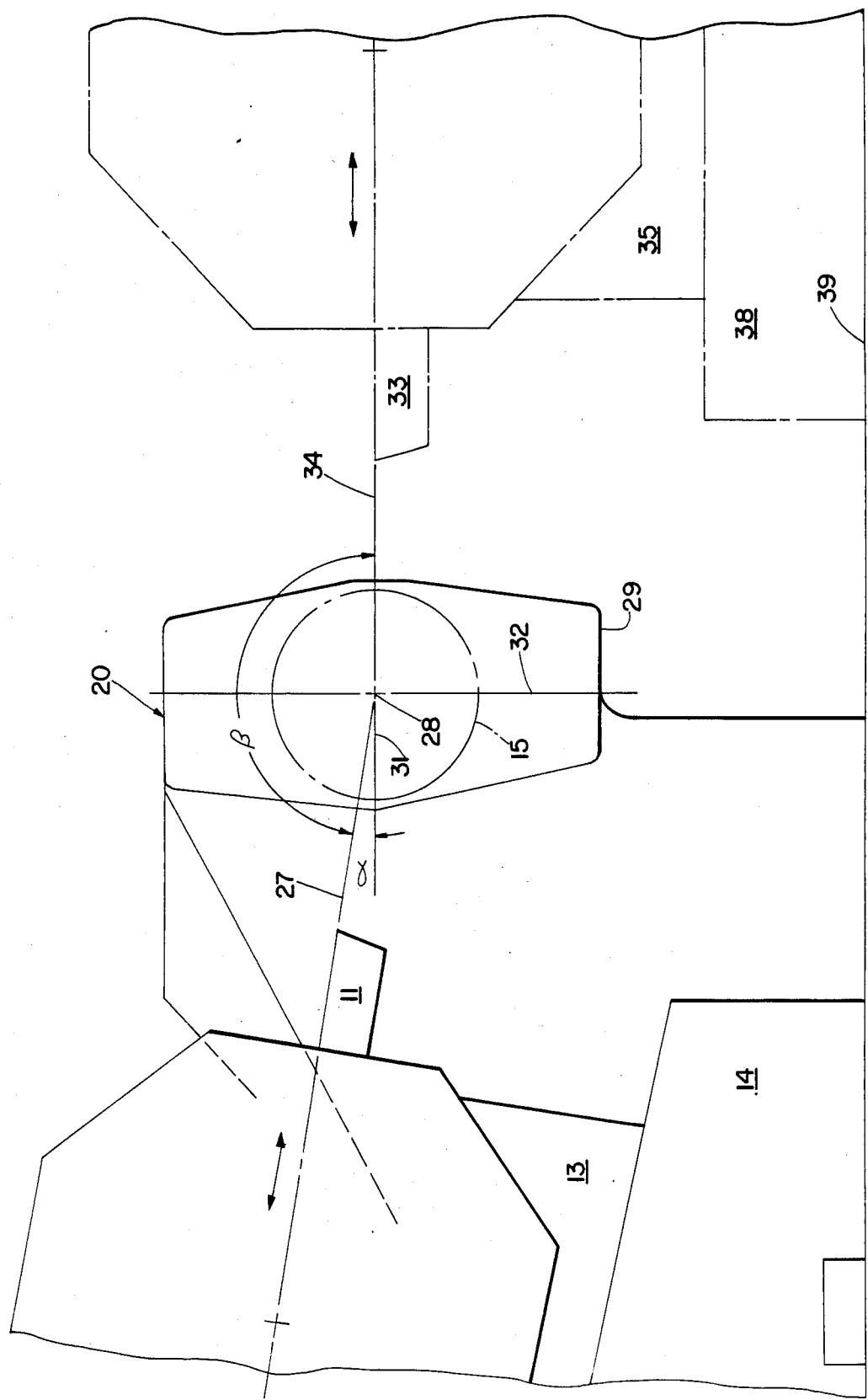
FIG. 3 is a view taken along the line 3—3 of FIG. 1.
Figure 4:
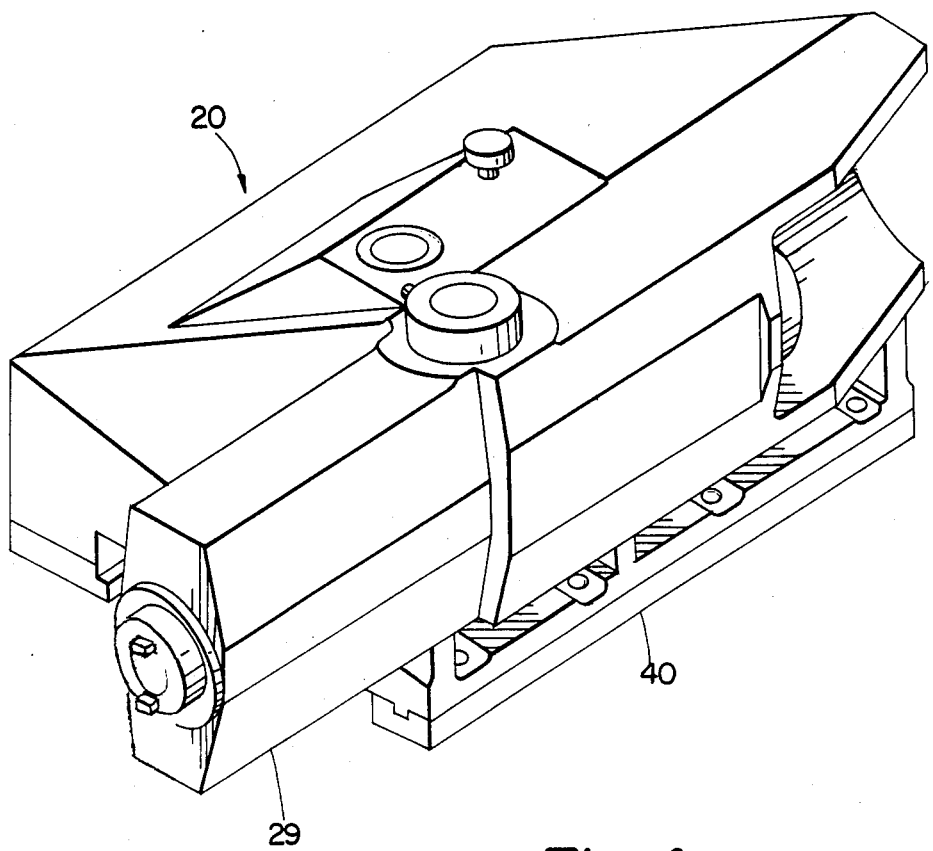
FIG. 4 is a perspective view of the modal coupling tailstock.

Referring to FIG. 3, the tool 11 of FIG. 1 is shown on a feed vector 27 which passes through the centerline 28 of the workpiece 15 and tailstock 20. Referring also to FIGS. 4-8 the beam portion 29 of the tailstock 20 is shown as having a cross-section which is generally rectangular, although, for reasons of style and the provision of draft angles to facilitate casting, the cross-section more closely resembles, at the bottom half a "keystone" shape, and at the top half an inverted keystone shape. The quill 23 is supported in a close-fitting bore 30 in the beam portion 29 and the quill 23, in turn, carries the support center 24 as is well-known in the art.

Here, although it was previously mentioned that Figs. 1 and 2 refer to "slant bed" machines, well-known in automatic machine art, it may be appreciated that the configuration of FIG. 3 is equally applicable to a horizontal machines, where the tailstock mounting plane and ways are horizontal. The beam portion 29 has a minor axis 31 passing through the centerline 28 of the workpiece 16 at the minimum dimension of the generally rectangular beam portion 29. A major axis 32 passes through the cross-section normal to the minor axis 31 and establishes the height of the cross-section. Through optimization of the design, the height-to-width ratio of the cross-section is about two, although the actual design figures for the specific embodiment have been chosen to be a width of approximately 5½ inches (137.5 mm) and height of 12½ inches (312.5 mm).

The tool feed vector 27 approaches the workpiece 15 at an angle alpha of approximately 10°. The saddle 14 therefor is provided with an included angle of 10° between the cross-slide 13 and the machine base 16.

In the case of a four-axis machine, the second tool 33 approaches on a feed vector 34 on the opposite side of the workpiece 15 and the feed vector 34 is directed along the minor axis 31 of the beam portion 29. Thus, an included angle of 170° is established between the first and second tools 11,13. The reason for the included angle between the first and second tools 11,33 being other than 180° is that applicant has determined that, since the separating forces occur at the cutting point of the tool, geometric stability of the workpiece will be enhanced: i.e., deflection of a workpiece away from a tool contacting a high spot on the workpiece and the corresponding separating force, will not result in a corresponding low spot being directly cut on the opposite side of the workpiece 15—as would be the case if the tools 11,33 were placed 180° apart. Therefore, any lobes on the workpiece 15 will tend not to be amplified, but rather, the lobing will be smoothed out in an averaging fashion.

In FIG. 3, the second tool cross-slide 35 and saddle 38 are movable on way systems which are parallel to one another and to the slanted plane 39 of the machine base 16.

Figure 6:
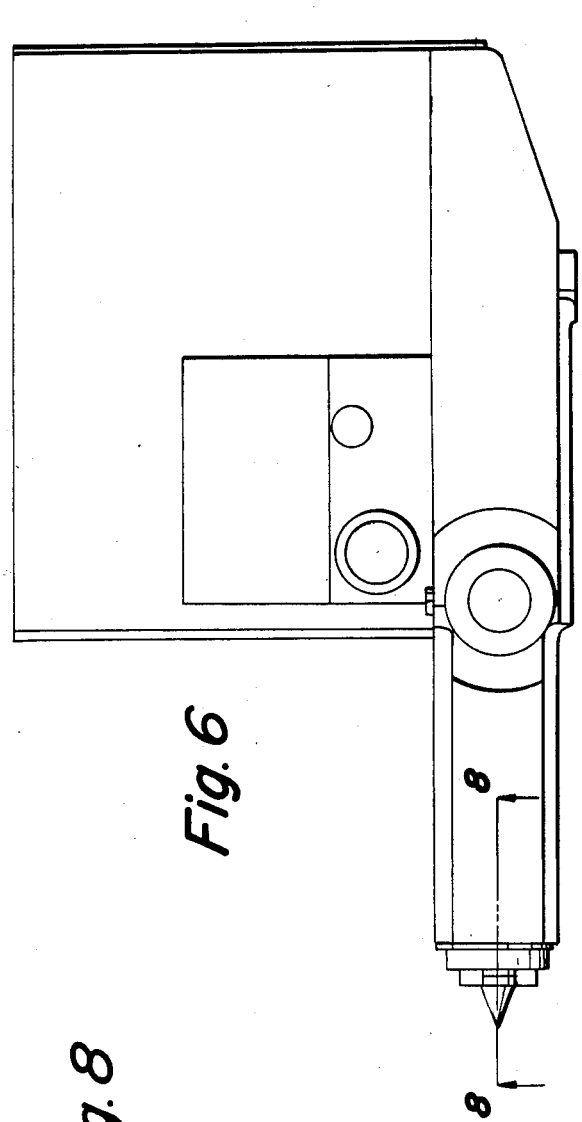
FIG. 6 is a view taken along the line 6—6 of FIG. 5.
Figure 5:
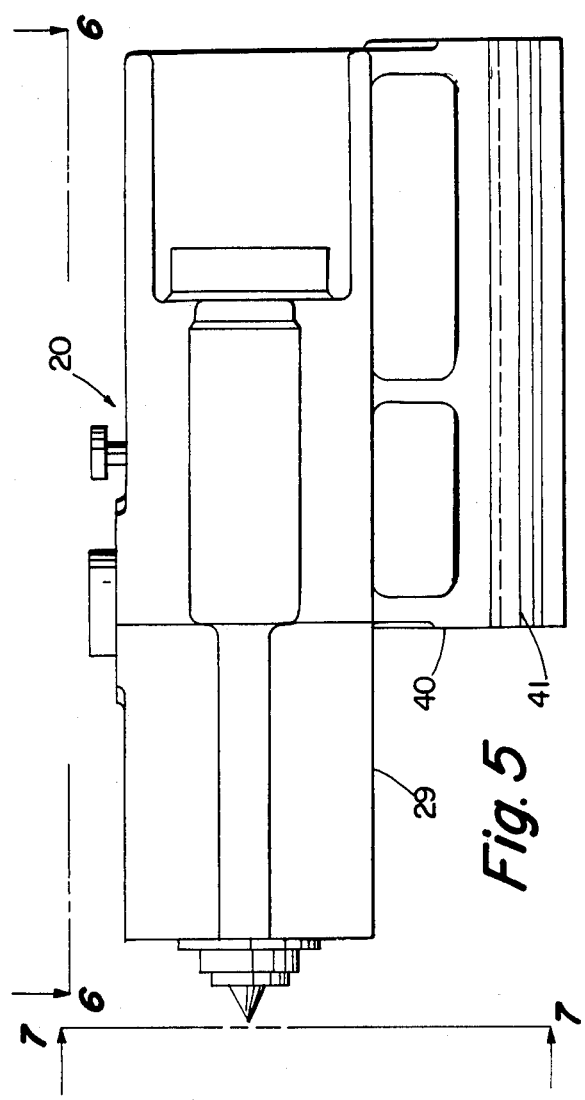
FIG. 5 is a view taken along the line 5—5 of FIG. 1.
Figure 8:
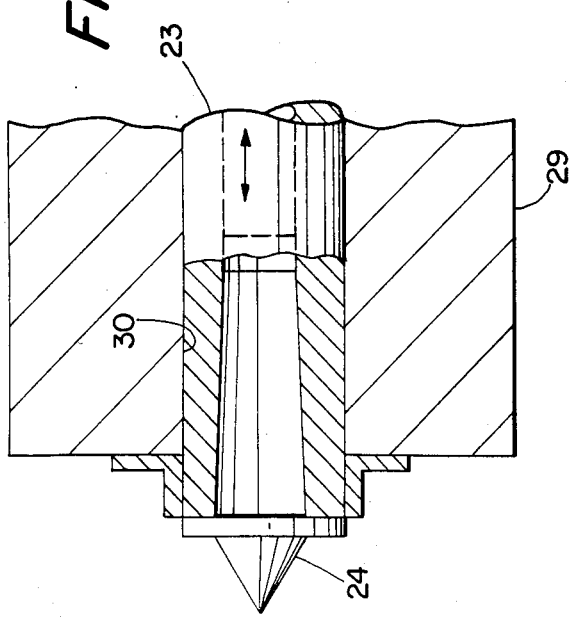
FIG. 8 is a sectional view taken along the line 8—8 of FIG. 6.
Figure 7:
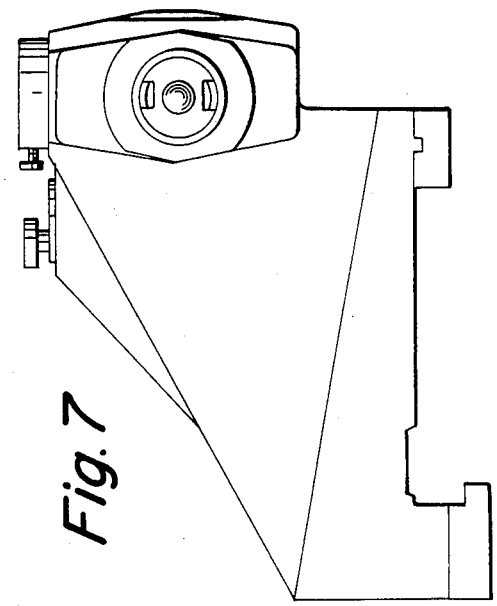
FIG. 7 is a view taken along the line 7—7 of FIG. 5.

FIG. 5 is an elevational view showing the tailstock 20, wherein the housing portion 40 is configured as a cored casting, having bottom way bearing surfaces 41 and the beam portion 29 extends, in a cantilevered fashion, outward from the housing portion 40. FIGS. 6 and 7 show further details of the tailstock 20. As shown in FIG. 8, the beam portion 29 is substantially solid and has a close-fitting bore 30 surrounding the quill 23. The quill 23 is advanced and retracted in accordance with a quill stroke cylinder (not shown).

As stated previously, the invention is applicable to both two-axis and four-axis machines, and is equally applicable to manual machines as well as automatics. Further, the base plane 39 of the machine may be in a variety of orientations, including horizontal.

Further, while the tailstock has been depicted as a cast member, the invention herein is applicable to fabricated structures, as well.

Additionally, those skilled in the art will appreciate that the cross-section of the beam portion may have a quasi-oval shape, such as an ellipse, or combination of shapes may be employed to establish the non-circular attributes.

Those skilled in the art will also appreciate that, while the beam portion has been depicted as substantially uniform in cross-section along the entire length of the beam, variances in size along the beam are possible in accordance wtih the principles of this disclosure.

Therefore, while the invention has been shown in connection with a preferred embodiment, it is not intended that the invention be so limited, but rather, the invention extends to all such designs and modifications as come with the scope of the appended claims.

What is claimed is:

1. In a turning machine having a base; a headstock with a headstock spindle rotatable about a spindle axis; a tool support means movably mounted on said base for advancing and retracting a tool along a radial feed vector passing through said spindle axis; a tailstock having a housing portion supported on said base, said tailstock having a central axis collinear with said headstock axis, and including center means for supporting a workpiece on said central axis; a improved tailstock wherein said improvement comprises:
   a beam portion extending from said tailstock housing portion, said beam portion having
      a neutral axis collinear with said tailstock central axis;
      a cross-sectional minor axis normal to said neutral axis and oriented substantially in line with said radial feed vector;
      a cross-sectional major axis normal to both said neutral axis and said minor axis;
   a means for mounting said center means in said beam portion,
   wherein said beam portion is non-circular in cross-section, and of substantially-greater dimension along said major axis in respect to a dimension along said minor axis, wherein said beam portion comprises a substantially rectangular cross-section centered about said neutral axis and wherein the ratio of major-to-minor dimensions of said rectangular cross-section is about 2:1.

2. The tailstock of claim 1, wherein said beam portion is cantilevered from said housing portion.

3. In a turning machine having a base; a headstock with a headstock spindle rotatable about a spindle axis; a first tool support means movably mounted on said base for advancing and retracting a first tool along a first radial feed vector passing through said spindle axis; a second tool support means movably mounted on said base for advancing and retracting a second tool along a second radial feed vector passing through said spindle axis; a tailstock having a housing portion supported on said base, said tailstock having a central axis collinear with said headstock axis, and including center means for supporting a workpiece on said central axis; an improved tailstock, wherein the improvement comprises:
a beam portion extending from said tailstock housing portion, said beam portion having
a neutral axis collinear with said tailstock central axis;
a cross-sectional minor axis normal to said neutral axis;
a cross-sectional major axis normal to both said neutral axis and said minor axis, said major axis extending transversely to said first and second feed vectors; and a means for mounting said center means in said beam portion, wherein said first and second feed vectors substantially oppose one another,
wherein said beam portion is non-circular, and of substantially-greater dimension along said major axis in respect to a dimension along said minor axis, wherein said beam portion comprises a substantially rectangular cross-section centered about said neutral axis and wherein the ratio of major-to-minor dimensions of said rectangular cross-section is about 2:1.

4. The tailstock of claim 3, wherein said beam portion is cantilevered from said housing portion.

* * * * *